United States Patent
Xu et al.

(10) Patent No.: US 10,123,011 B2
(45) Date of Patent: Nov. 6, 2018

(54) HISTOGRAM SEGMENTATION BASED LOCAL ADAPTIVE FILTER FOR VIDEO ENCODING AND DECODING

(71) Applicant: Intel Corporation, Santa Clara, CA (US)

(72) Inventors: Lidong Xu, Beijing (CN); Yi-Jen Chiu, San Jose, CA (US); Wenhao Zhang, Beijing (CN); Hong Jiang, El Dorado, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 15/589,165

(22) Filed: May 8, 2017

(65) Prior Publication Data

US 2017/0244963 A1    Aug. 24, 2017

Related U.S. Application Data

(63) Continuation of application No. 15/459,043, filed on Mar. 15, 2017, which is a continuation of application
(Continued)

(51) Int. Cl.
*H04N 7/12* (2006.01)
*H04N 19/117* (2014.01)
(Continued)

(52) U.S. Cl.
CPC ......... *H04N 19/117* (2014.11); *H04N 19/136* (2014.11); *H04N 19/147* (2014.11); *H04N 19/182* (2014.11); *H05K 999/99* (2013.01)

(58) Field of Classification Search
CPC .................................................... H04N 19/117
See application file for complete search history.

(56) References Cited

U.S. PATENT DOCUMENTS 9,485,521 B2 *  11/2016  Lim ....................... H04N 19/82
2003/0040908 A1   2/2003  Yang et al.
(Continued)

FOREIGN PATENT DOCUMENTS

CN       101568033 A       10/2009
CN       102629371 A        8/2012
(Continued)

OTHER PUBLICATIONS

JP office action issued in corresponding JP divisional application No. 2016175993 dated Sep. 12, 2017 (41 pages).
(Continued)

*Primary Examiner* — Tracy Y Li
(74) *Attorney, Agent, or Firm* — Trop Pruner & Hu, P.C.

(57) ABSTRACT

Reconstructed picture quality for a video codec system may be improved by categorizing reconstructed pixels into different histogram bins with histogram segmentation and then applying different filters on different bins. Histogram segmentation may be performed by averagely dividing the histogram into M bins or adaptively dividing the histogram into N bins based on the histogram characteristics. Here M and N may be a predefined, fixed, non-negative integer value or an adaptively generated value at encoder side and may be sent to decoder through the coded bitstream.

22 Claims, 3 Drawing Sheets

Related U.S. Application Data

No. 13/991,592, filed on Jun. 4, 2013, now Pat. No. 9,661,322.

(51) Int. Cl.
*H04N 19/182* (2014.01)
*H04N 19/147* (2014.01)
*H04N 19/136* (2014.01)

(56) References Cited

U.S. PATENT DOCUMENTS

| | | | |
|---|---|---|---|
| 2012/0082218 A1 | 4/2012 | Misra et al. | |
| 2012/0176404 A1* | 7/2012 | Broughton | G06F 21/84 345/619 |
| 2013/0051463 A1* | 2/2013 | Minoo | H04N 19/139 375/240.12 |
| 2013/0114674 A1* | 5/2013 | Chong | H04N 19/86 375/240.02 |
| 2013/0272376 A1* | 10/2013 | Maani | H04N 19/82 375/240.02 |
| 2014/0119433 A1* | 5/2014 | Park | H04N 19/44 375/240.02 |

FOREIGN PATENT DOCUMENTS

| | | |
|---|---|---|
| CN | 102640497 A | 8/2012 |
| EP | 2665275 A1 | 11/2013 |
| WO | 2011039931 A1 | 4/2011 |
| WO | 2011064945 A1 | 6/2011 |
| WO | 2012121280 A1 | 9/2012 |

OTHER PUBLICATIONS

JP office action issued in corresponding divisional JP application No. 2017-106047 dated Apr. 20, 2018 (4 pages).
PCT International Search Report and Written Opinion issued in corresponding PCT/CN2012/081812 dated Jul. 4, 2013.
EP search report issued in corresponding EP application No. 12884981.7 dated Mar. 16, 2016.
JP office action issued in corresponding JP application No. 2015-532266 dated Mar. 1, 2016.

* cited by examiner

HISTOGRAM SEGMENTATION BASED LOCAL ADAPTIVE FILTER FOR VIDEO ENCODING AND DECODING

CROSS-REFERENCE TO RELATED APPLICATION

This application is a continuation claiming priority to a continuation application Ser. No. 15/459,043, filed on Mar. 15, 2017, which is a continuation of U.S. patent application Ser. No. 13/991,592, filed Jun. 4, 2013, hereby expressly incorporated by reference.

BACKGROUND

This relates to video compression.

In lossy video coding, quantization of transform coefficients will introduce quality degradation to reconstructed pictures. A larger quantization step introduces bigger picture quality loss.

To improve the reconstructed picture quality and improve the video compression gain, an adaptive filter may be applied as an out-loop video processing tool or as part of in-loop modules in the core video coding pipeline to partially compensate for the picture quality loss.

BRIEF DESCRIPTION OF THE DRAWINGS

Some embodiments are described with respect to the following figures.

DETAILED DESCRIPTION

Having considered that a global Wiener filter may lose adaptation to some local pixel information, one could apply a Wiener filter locally on the adaptively selected pixels, use a histogram segmentation scheme to help select pixels for filtering. But a Wiener filter may lack the ability to handle constant quality loss within a histogram bin. Therefore, a modified Wiener filter with offset may be used to adaptively filter histogram bins.

Reconstructed picture quality for a video codec system may be improved by categorizing reconstructed pixels into different histogram bins with histogram segmentation and then applying different filters on different bins. Histogram segmentation may be performed by evenly dividing the histogram into M bins or adaptively dividing the histogram into N bins based on the histogram characteristics. For example, if the pixel value range is 0-255, then evenly dividing the histogram into M bins means that each bin has the interval of 256/M pixel values. Here M and N may be a predefined, fixed, non-negative integer value or an adaptively generated value at the encoder side and may be sent to the decoder through the coded bitstream. Histogram characteristics involve distributions of pixel values. There are many published papers introducing methods of histogram segmentation and/or partitioning.

Reconstructed picture quality may be improved for the video codec system by applying multiple available histogram segmentation schemes and determining the best segmentation scheme for filtering based on the Rate Distortion Optimization (RDO) criterion at the encoder side, and then sending a flag to the decoder to indicate the determination result. Reconstructed picture quality for the video codec system may be improved by adaptively applying filters on the segmented histogram bins based on an RDO criterion, and then sending flags through the coded bitstream to indicate which histogram bins should be filtered.

Figure 1:
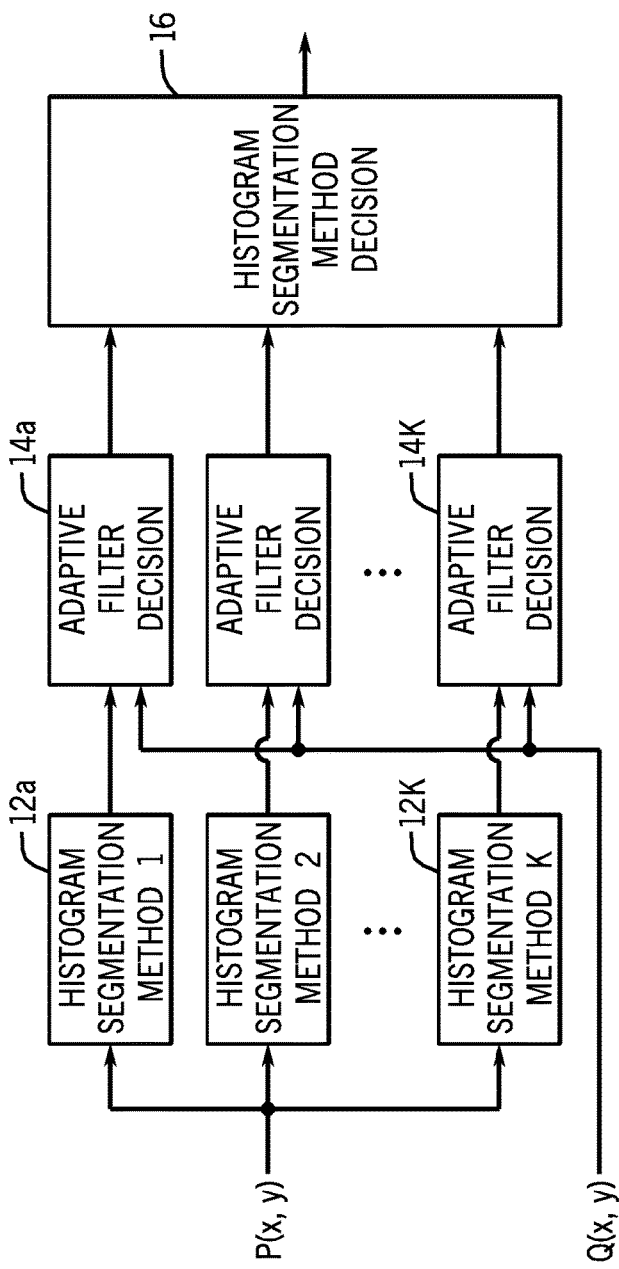
FIG. 1 shows one example of an encoding flow for a filtering decision when multiple histogram segmentation methods are applied.

An adaptive Wiener filter may be applied with offset for a histogram bin. The Wiener filter coefficients and the offset value for a histogram bin may be generated adaptively at the encoder side and then the coefficients and the offset value are sent to the decoder through the coded bitstream. The Weiner filter with offset is applied on reconstructed pixels P(x, y) in a histogram bin to get filtered pixel value P'(x, y) for the bin. Then the Weiner filter coefficients and the offset value may be calculated by minimizing the sum of absolute differences (SSD) between the filtered pixel values $P'_{(x, y)}$ and the original input pixel values Q(x, y), as shown in FIG. 1 at the encoder side and then the coefficients and the offset value are sent to decoder through the coded bitstream. In some embodiments, the offset value may be forced to zero, and only the Wiener filter coefficients need to be generated at the encoder side and then sent to the decoder.

In some embodiments, an offset value is only applied to a histogram bin without applying the Wiener filter. In this case, only the offset value needs to be generated for a histogram bin at the encoder side and then sent to the decoder.

In some embodiments, some of the Wiener filter coefficients may be forced to be zero to save the transmission bandwidth, and then these coefficients need not be sent to decoder.

Reconstructed picture quality for the video codec system may be improved by adaptively selecting global filtering or histogram-segmentation based local filtering based on RDO criterion at encoder side, and then sending a flag to the decoder to indicate the selection result. The global filtering is in fact a special case of histogram-segmentation based local filtering. If the whole histogram is regarded as a single bin (no segmentation), then the local filtering is in fact global filtering on all pixels in the picture. In FIG. 1, one histogram segmentation method can be set to "do not segment" for this case.

Reconstructed picture quality for the video codec system may be improved by adaptively determining the frame to be filtered (or not) based on RDO criteria at the encoder side, and then sending a flag to the decoder to indicate the determination result.

In a video codec, an adaptive Wiener filter aims to minimize the differences between two input pictures or picture regions, and the filter coefficients that need to be transmitted to decoder side. Let Q(x,y) denote the value of the encoder input pixel at position (x,y), and P(x,y) denote the value of the reconstructed pre-filtering pixel at position (x,y). Adaptive Wiener filtering with offset is performed on P(x,y) as indicated equation (1) to get the post-filter pixel value P'(x,y):

$$P'(x,y) = \sum_{m=-M_0}^{M_1} \sum_{n=-N_0}^{N_1} P(x+m, y+n) C_{n,m} + \text{Offset} \quad (1)$$

Where, $C_{m,n}$ denotes the adaptive filtering coefficients, and Offset denotes the offset value added to the corresponding histogram bins. $M_0, M_1, N_0, N_1$ are parameters to control the number of Wiener filter taps. With different settings in the following list of variables of $M_0, M_1, N_0, N_1$, the filter may be a symmetric filter or asymmetric filter, a 1-D filter or 2-D filter. The parameters $M_0, M_1, N_0, N_1$ may be set to predefined fixed values. These fixed values may be presented in video coding standard specifications so that both the encoder and decoder can use the same values. Alternatively, $M_0$, $M_1$, $N_0$, $N_1$ may have several predefined candidate values. Then the encoder can select the best candidate based on the RDO criteria, and then send a flag to the decoder to indicate which candidate to use.

The coefficients $C_{m,n}$ and offset value Offset may be adaptively generated at the encoder side and then may be coded into bitstreams for decoding. One method to generate $C_{m,n}$ and Offset values is to minimize the sum of squared distortions between $Q(x,y)$ and $P'(x,y)$.

The derivation of the filter taps is provided below. For easy description, one can map the 2D filter tap Cmn to 1D filter tap Ci, and map the 2D pixel index (x,y) to 1D pixel index (i). Consider the input pixel $Q(k)$ and the output of the Wiener filter $P'(k)$ consisting of the reconstructed mapped pixel $P(k)$ in the filter support $\{S\}$, sized as L+1, with the weight $C_i$. The adaptive (Wiener) filter function is $$P'(k) = \sum_{i \in \{S\}} P(k+i) \cdot C_i \qquad [2]$$

The residual signal among input pixel $Q(i)$ and the Wiener filtered pixel $P'(i)$ is defined as $$\text{error}_k = P'(k) - Q(k) \qquad [3]$$

The Wiener filter is optimal by minimizing the mean square error with the filter taps $\{C_i\}$ $$C_i = \arg\min E[\text{error}_k^2] \qquad [4]$$

where E[ ] is the expectation of the square of the residual signal for the pixels of interest which could be the pixels from a sequence of pictures, a picture, or some region inside a picture.

$$E[\text{error}_k^2] = E[(P'(k) - Q(k))^2] = \qquad [5]$$
$$E\left[\left(\sum_{i \in \{S\}} P(k+i) \cdot C_i\right)^2\right] + E[(Q(k))^2] - 2E\left[\left(\sum_{i \in \{S\}} (P(k+i) \cdot C_i)(Q(k))\right)\right]$$

To find the minimum of $E[\text{error}_k^2]$, the derivative is taken with respect to $C_i$. The filter taps could be derived by letting the derivative be equal to zero, $$\frac{\partial}{\partial c_i} E[\text{error}_k^2] = 2\left(\sum_{j \in \{S\}} E\{P(k+j) \cdot P(k+i)\}C_i\right) - 2E[P(k+i) \cdot Q(k)] = 0 \qquad [6]$$

The autocorrelation function of $P(k)$ is denoted below Equation [7] and the cross-correlation function among $P(k)$ and $Q(k)$ is denoted below Equation [8].

$$r_{PP}(i) = E[P(k) \cdot P(k+i)] \qquad [7]$$

$$r_{QP}(i) = E[Q(k) \cdot P(k+i)] \qquad [8]$$

One can rewrite Equation [5] in the matrix form $$\begin{bmatrix} r_{PP}(0) & r_{PP}(1) & \cdots & r_{PP}(L) \\ r_{PP}(1) & r_{PP}(0) & \cdots & r_{PP}(L-1) \\ \vdots & \vdots & \ddots & \vdots \\ r_{PP}(L) & r_{PP}(L-1) & \cdots & r_{PP}(0) \end{bmatrix} \begin{bmatrix} c_0 \\ c_1 \\ \vdots \\ c_L \end{bmatrix} = \begin{bmatrix} r_{QP}(0) \\ r_{QP}(1) \\ \vdots \\ r_{QP}(L) \end{bmatrix} \qquad [9]$$

Thus, the Wiener filter tap set $\{C\}$ can be derived in the matrix format $$R_{PP} \cdot C = R_{QP} \rightarrow C = R_{PP}^{-1} \cdot R_{QP} \qquad [10]$$

where $R_{PP}^{-1}$ is the inverse matrix of the auto-correlation matrix in Equation [9].

After obtaining Ci, it could be mapped back to Cmn. Then the offset could be calculated by $$\text{Offset} = \frac{1}{N} \sum_{x,y} (P'(x,y) - Q(x,y)),$$

where N is the number of pixels in the histogram bin.

The collection of auto-correlation functions in Equations [7] and [10] can be obtained at the video decoder side, but the cross-correlation in Equations [8] and [10] has to be derived at the video encoder side due to the requirement of the input $\{x\}$ only being available at video encoder side. Thus, we need to transmit the filter taps derived in Equation [10] from video encoder to video decoder.

The transmitting of the cross-correlation function, instead of the derived filter taps, is sufficient in some cases because the video decoder could derive the filter taps with the reception of cross-correlation function plus the decoded deblocked data $\{y\}$ at its own hand.

More accurate statistical information may be obtained in some cases to improve coding efficiency further by skipping the pixels close to the picture border. The right hand side of Equation [10] is an expression of this skipping.

The filter taps could be derived per luma and per chroma channel respectively. Better coding efficiency is achieved for the chroma picture based on the filter taps derived with only chroma pixel. Some scenarios use the one chroma table shared by both Cb and Cr channels, or one can use two individual tables for Cb and Cr respectively.

This approach is scalable and it could be extended to include the deblocked pictures, in addition to the adaptive filtered picture, to serve as the reference picture for the phase of the motion estimation. This doubles the amount of the reference pictures to improve the accuracy of motion estimation, without extra information being sent from the video encoder side, because the deblocked picture is always accessible on the video decoder side.

In some scenarios, the coding efficiency of the adaptive filter is better than the case of only applying the deblocking filter. That is, one can apply the adaptive filter, but remove the deblocking filter from the core coding loop.

When filtering a picture with a global Wiener filter, the filter coefficients are trained with all the pixels in the picture. In this case, the filtering will reduce the distortions of some pixels, but it will also increase the distortions of other pixels. So, more coding gain may be obtained by only perform the Wiener filtering on part of the pixels in the picture.

One method is to categorize pixels into groups with histogram segmentation and then perform Wiener filtering adaptively (depending on RDO criterion) on each histogram bin. Histogram segmentation divides pixels values into multiple bins, wherein one bin is a group of pixels whose values fall into the bin. Suppose that the histogram is divided into N bins (with any kind of histogram segmentation method including uniform or non-uniform methods). Then, the encoder can decide which bins to filter and generate filtering parameters, i.e., coefficients $C_{m,n}$ and Offset, for those to-be filtered bins, and then transmit the related information to the decoder.

When applying multiple histogram segmentation methods, the encoder can determine which RDO criteria is used to filter the current picture and then send the determination result to decoder. The encoder can do multi task encoding (one pass for one segmentation method) and calculate the rate distortion (RD) cost for each pass. Then the pass with the minimum RD cost will be used for the final encoding.

Referring to FIG. 1, the value of the reconstructed pre-filtering pixel at position (x,y), P(x,y), may be fed to a histogram segmentation method 12a-k. In this case multiple histogram segmentation methods are applied and each one operates on the value. This produces outputs that are provided to adaptive filter decisions 14a-14k. Also applied to the adaptive filter decision 14a-k is the value of the encoder input pixel at position (x,y), Q (x,y). Based on these inputs, the adaptive filter decisions output a value to the histogram segmentation method decision 16 which then produces the desired result. The adaptive filter decision includes the adaptive Wiener filter with offset.

Figure 2:
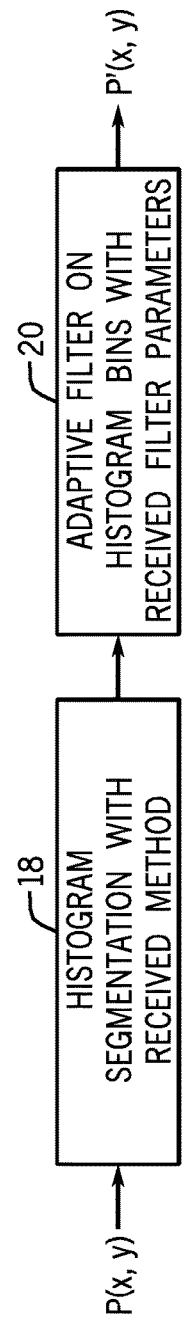
FIG. 2 shows the corresponding decoder flow.

Referring to FIG. 2, which relates to the decoder as opposed to the encoder side, the value P(x,y) is applied to the histogram segmentation with received method block 18. When multiple histograms segmentation methods are defined, the decoder will receive a flag from the encoder indicating which segmentation method was selected by the encoder. After having received the method flag, the decoder can do histogram segmentation on P(x,y) with the received method. Its output is provided to an adaptive filter on histogram bins with received filter parameters 20 to output the post-filter pixel value P'(x,y).

Figure 3:
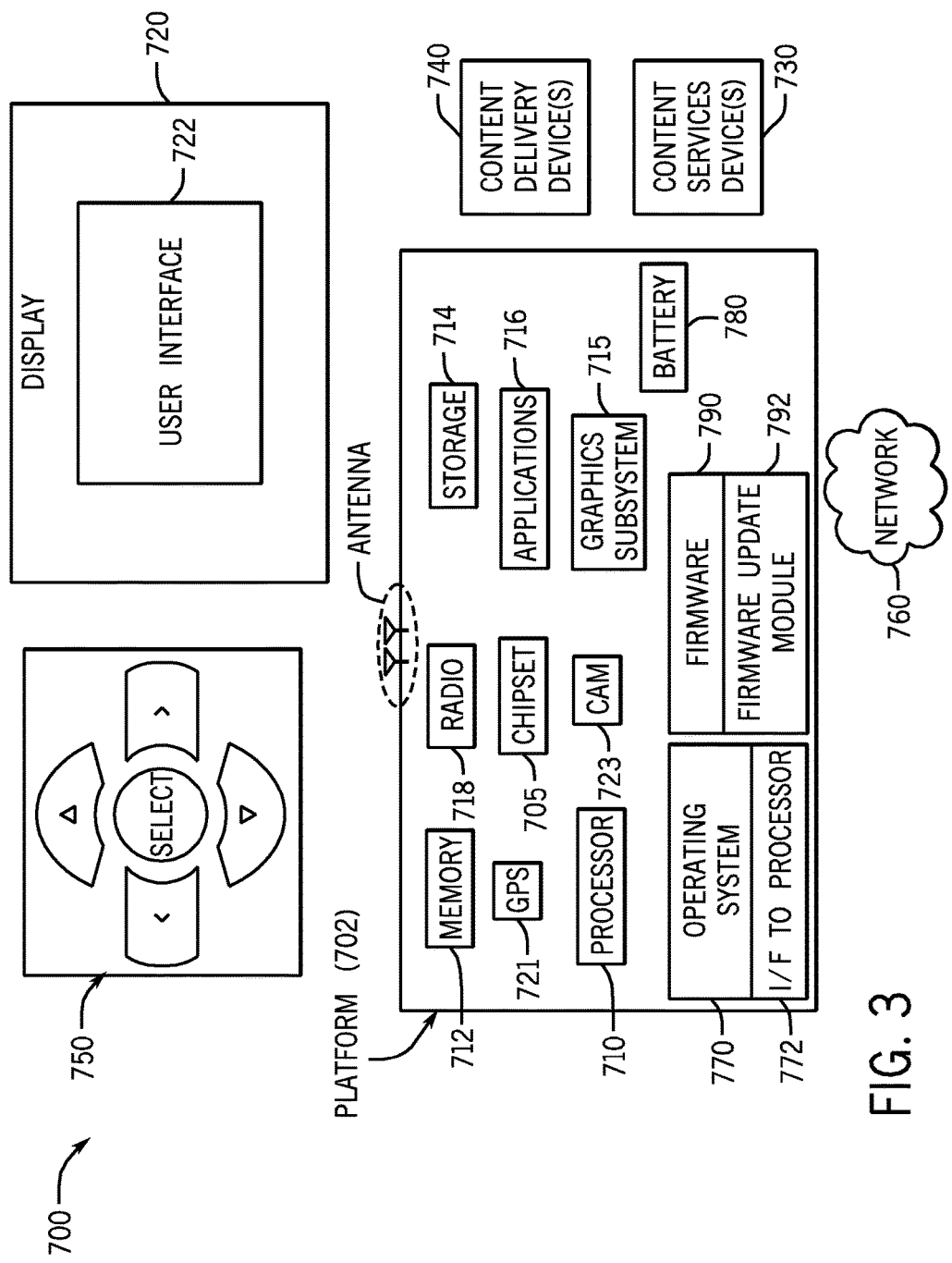
FIG. 3 is a system depiction for one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 1 and 2 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
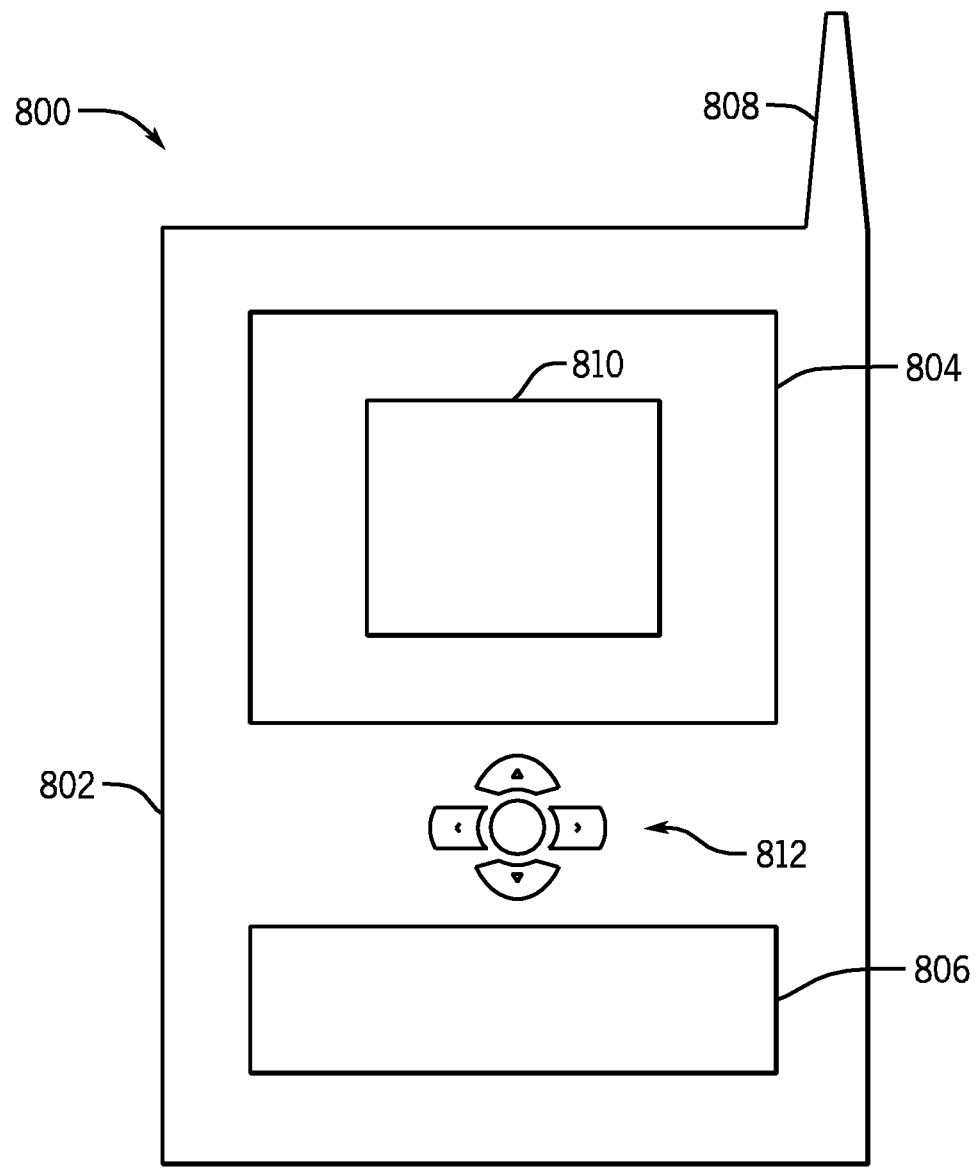
FIG. 4 is a front elevational view of one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be an apparatus comprising a video encoder including an adaptive filter with offset, using multiple histogram bin segmentation, said filter to separately adaptively filter pixel values in a first bin, the filter offset adapted to said first bin, and said filter to set the offset based on a sum of differences between filtered values output from the adaptive filter and original input pixel values input to the adaptive filter divided by the number of pixels in the first histogram bin, said filter to separately adaptively filter pixel values in a second bin, the filter offset adapted to said second bin, and said filter to set the offset based on a sum of differences between filtered values output from the adaptive filter and original input pixel values input to the adaptive filter divided by the number of pixels in the second histogram bin, and a video encoder. The apparatus may include said encoder to evenly divide the histogram into bins. The apparatus may include said encoder to signal the offsets to a remote decoder. The apparatus may include said encoder to identify a segmentation method based on a rate-distortion cost.

Another example embodiment may be a method comprising using multiple histogram bin segmentation including first and second bins in an adaptive filter with offset, separately adaptively filtering pixel values in a first bin, the filter offset for the first bin adapted to the first bin, setting an offset for said first bin based on a sum of differences between filtered values output from the adaptive filter and original input pixel values input to the adaptive filter divided by the number of pixels in the first bin, separately adaptively filtering pixel values in a second bin, the filter offset for the second bin adapted to said second bin, and setting an offset for the second bin based on a sum of differences between filtered values output from the adaptive filter and original input pixel values input to the adaptive filter divided by the number of pixels in the second bin. The method may include evenly dividing a histogram into bins. The method may include signaling the offsets to a remote decoder. The method may include identifying a segmentation method based on a rate-distortion cost.

In another example embodiment may be one or more non-transitory computer readable media storing instructions to perform a sequence comprising using multiple histogram bin segmentation including first and second bins in an adaptive filter with offset, separately adaptively filtering pixel values in a first bin, the filter offset for the first bin adapted to the first bin, setting an offset for said first bin based on a sum of differences between filtered values output from the adaptive filter and original input pixel values input to the adaptive filter divided by the number of pixels in the first bin, separately adaptively filtering pixel values in a second bin, the filter offset for the second bin adapted to said second bin, and setting an offset for the second bin based on a sum of differences between filtered values output from the adaptive filter and original input pixel values input to the adaptive filter divided by the number of pixels in the second bin. The media may further store instructions to perform a sequence including evenly dividing a histogram into bins. The media may further store instructions to perform a sequence including signaling the offsets to a remote decoder. The media may further store instructions to perform a sequence including identifying a segmentation method based on a rate-distortion cost.

In yet another example embodiment may be an apparatus comprising means for using multiple histogram bin segmentation including first and second bins in an adaptive filter with offset, means for separately adaptively filtering pixel values in a first bin, the filter offset for the first bin adapted to the first bin, means for setting an offset for said first bin based on a sum of differences between filtered values output from the adaptive filter and original input pixel values input to the adaptive filter divided by the number of pixels in the first bin; means for separately adaptively filtering pixel values in a second bin, the filter offset for the second bin adapted to said second bin, and means for setting an offset for the second bin based on a sum of differences between filtered values output from the adaptive filter and original input pixel values input to the adaptive filter divided by the number of pixels in the second bin. The apparatus may include means for evenly dividing a histogram into bins. The apparatus may include means for signaling the offsets to a remote decoder. The apparatus may include means for identifying a segmentation method based on a rate-distortion cost.

Another example embodiment may be a video encoder including an adaptive filter with offset, using multiple histogram bin segmentation, said filter to separately adaptively filter pixel values in a first bin, the filter offset adapted to said first bin, and said filter to set the offset based on a sum of differences between filtered values output from the adaptive filter and original input pixel values input to the adaptive filter divided by the number of pixels in the first histogram bin, said filter to separately adaptively filter pixel values in a second bin, the filter offset adapted to said second bin, and said filter to set the offset based on a sum of differences between filtered values output from the adaptive filter and original input pixel values input to the adaptive filter divided by the number of pixels in the second histogram bin, and a display coupled to said encoder. The system may include said encoder to evenly divide the histogram into bins. The system may include said encoder to signal the offsets to a remote decoder. The system may include said encoder to identify a segmentation method based on a rate-distortion cost. The system may include a battery coupled to said encoder. The system may include a radio coupled to said encoder.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
  a video encoder including an adaptive filter with offset, using multiple histogram bin segmentation, said filter to separately adaptively filter pixel values in a first bin, the filter offset adapted to said first bin, and said filter to set the offset based on a sum of differences between filtered values output from the adaptive filter and original input pixel values input to the adaptive filter divided by the number of pixels in the first histogram bin, said filter to separately adaptively filter pixel values in a second bin, the filter offset adapted to said second bin, and said filter to set the offset based on a sum of differences between filtered values output from the adaptive filter and original input pixel values input to the adaptive filter divided by the number of pixels in the second histogram bin; and a video decoder.

2. The apparatus of claim 1, said encoder to evenly divide the histogram into bins.

3. The apparatus of claim 1, said encoder to signal the offsets to a remote decoder.

4. The apparatus of claim 1, said encoder to identify a segmentation method based on a rate-distortion cost.

5. A method comprising:
using multiple histogram bin segmentation including first and second bins in an adaptive filter with offset;
separately adaptively filtering pixel values in a first bin, the filter offset for the first bin adapted to the first bin;
setting an offset for said first bin based on a sum of differences between filtered values output from the adaptive filter and original input pixel values input to the adaptive filter divided by the number of pixels in the first bin;
separately adaptively filtering pixel values in a second bin, the filter offset for the second bin adapted to said second bin; and
setting an offset for the second bin based on a sum of differences between filtered values output from the adaptive filter and original input pixel values input to the adaptive filter divided by the number of pixels in the second bin.

6. The method of claim 5, including evenly dividing a histogram into bins.

7. The method of claim 5, including signaling the offsets to a remote decoder.

8. The method of claim 5, including identifying a segmentation method based on a rate-distortion cost.

9. One or more non-transitory computer readable media storing instructions to perform a sequence comprising:
using multiple histogram bin segmentation including first and second bins in an adaptive filter with offset;
separately adaptively filtering pixel values in a first bin, the filter offset for the first bin adapted to the first bin;
setting an offset for said first bin based on a sum of differences between filtered values output from the adaptive filter and original input pixel values input to the adaptive filter divided by the number of pixels in the first bin;
separately adaptively filtering pixel values in a second bin, the filter offset for the second bin adapted to said second bin; and
setting an offset for the second bin based on a sum of differences between filtered values output from the adaptive filter and original input pixel values input to the adaptive filter divided by the number of pixels in the second bin.

10. The media of claim 9, further storing instructions to perform a sequence including evenly dividing a histogram into bins.

11. The media of claim 9, further storing instructions to perform a sequence including signaling the offsets to a remote decoder.

12. The media of claim 9, further storing instructions to perform a sequence including identifying a segmentation method based on a rate-distortion cost.

13. An apparatus comprising:
means for using multiple histogram bin segmentation including first and second bins in an adaptive filter with offset;
means for separately adaptively filtering pixel values in a first bin, the filter offset for the first bin adapted to the first bin;
means for setting an offset for said first bin based on a sum of differences between filtered values output from the adaptive filter and original input pixel values input to the adaptive filter divided by the number of pixels in the first bin;
means for separately adaptively filtering pixel values in a second bin, the filter offset for the second bin adapted to said second bin; and
means for setting an offset for the second bin based on a sum of differences between filtered values output from the adaptive filter and original input pixel values input to the adaptive filter divided by the number of pixels in the second bin.

14. The apparatus of claim 13, including means for evenly dividing a histogram into bins.

15. The apparatus of claim 13, including means for signaling the offsets to a remote decoder.

16. The apparatus of claim 13, including means for identifying a segmentation method based on a rate-distortion cost.

17. A system comprising:
a video encoder including an adaptive filter with offset, using multiple histogram bin segmentation, said filter to separately adaptively filter pixel values in a first bin, the filter offset adapted to said first bin, and said filter to set the offset based on a sum of differences between filtered values output from the adaptive filter and original input pixel values input to the adaptive filter divided by the number of pixels in the first histogram bin, said filter to separately adaptively filter pixel values in a second bin, the filter offset adapted to said second bin, and said filter to set the offset based on a sum of differences between filtered values output from the adaptive filter and original input pixel values input to the adaptive filter divided by the number of pixels in the second histogram bin; and
a display coupled to said encoder.

18. The system of claim 17, said encoder to evenly divide the histogram into bins.

19. The system of claim 17, said encoder to signal the offsets to a remote decoder.

20. The system of claim 17, said encoder to identify a segmentation method based on a rate-distortion cost.

21. The system of claim 17, including a battery coupled to said encoder.

22. The system of claim 17, including a radio coupled to said encoder.

* * * * *